(No Model.)  3 Sheets—Sheet 2.

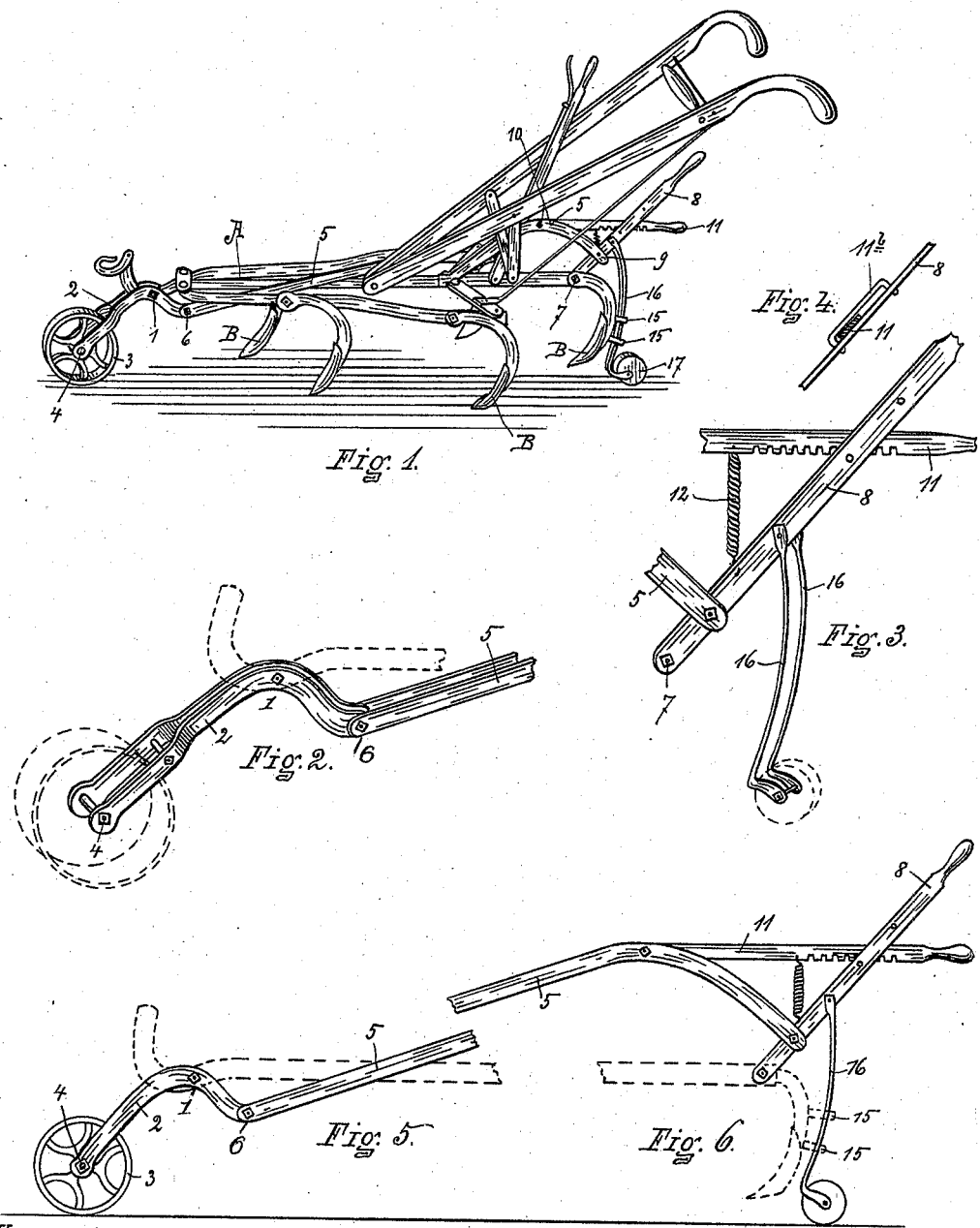

DE WANE B. SMITH.
CULTIVATOR.

No. 575,434. Patented Jan. 19, 1897.

WITNESSES.
Rich. A. George
E. W. Jones

INVENTOR
DE WANE B. SMITH
By Risley, Robinson & Love
ATTORNEY's.

(No Model.) 3 Sheets—Sheet 3.

DE WANE B. SMITH.
CULTIVATOR.

No. 575,434. Patented Jan. 19, 1897.

WITNESSES.
Rich. A. George.
E. W. Jones.

INVENTOR
DE WANE B. SMITH
BY Ruley, Robinson & Love
ATTORNEY'S

UNITED STATES PATENT OFFICE.

DE WANE B. SMITH, OF DEERFIELD, NEW YORK.

CULTIVATOR.

SPECIFICATION forming part of Letters Patent No. 575,434, dated January 19, 1897.

Application filed December 7, 1895. Serial No. 571,347. (No model.)

*To all whom it may concern:*

Be it known that I, DE WANE B. SMITH, of Deerfield, in the county of Oneida and State of New York, have invented certain new and useful Improvements in Cultivators; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to improvements in cultivators, or more particularly to devices for carrying the cultivators and gaging the depth of cut of its teeth.

Figure 7:
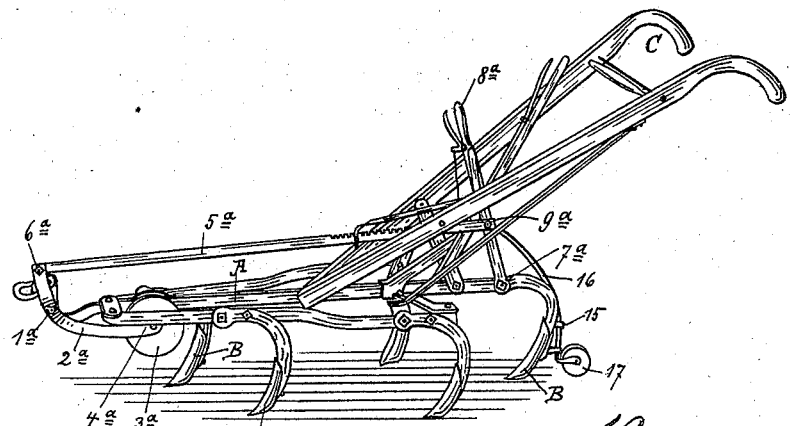
Figure 8:
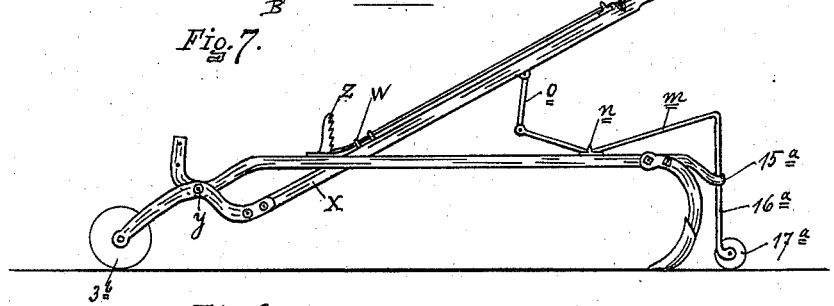
Figure 9:
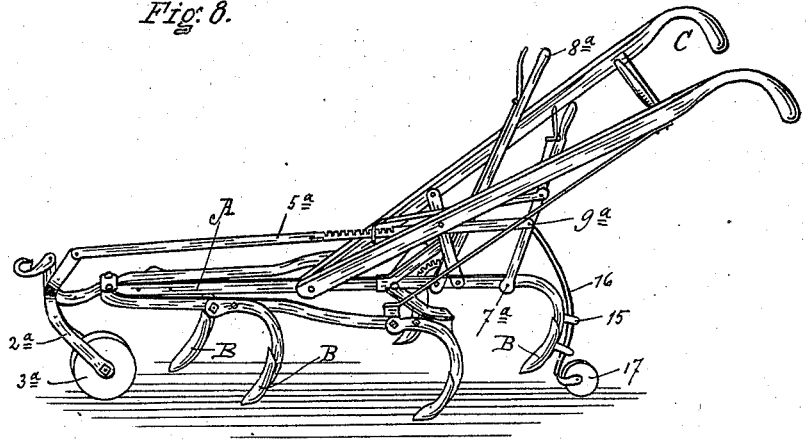
Figure 10:
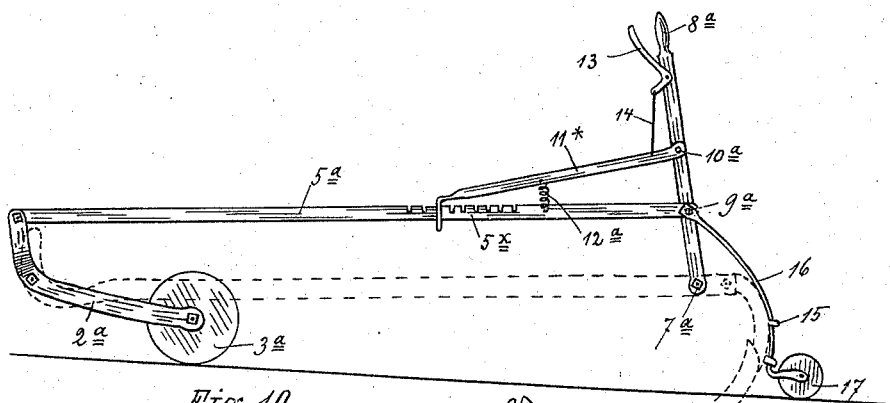
Figure 11:
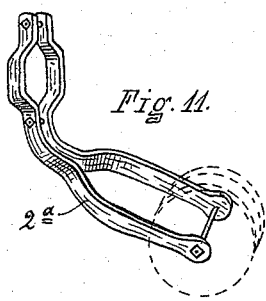
Figures 12, 13:
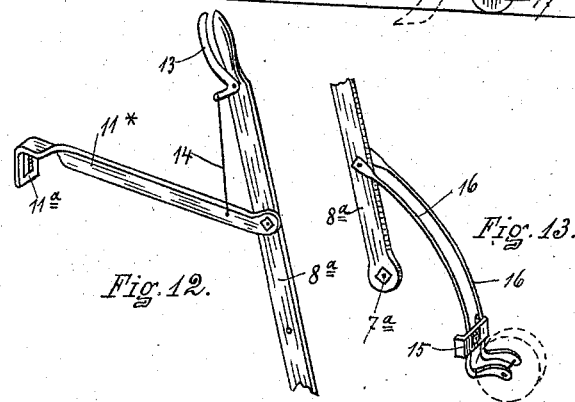
Figure 14:
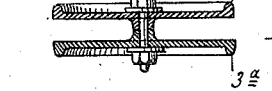
Figure 15:
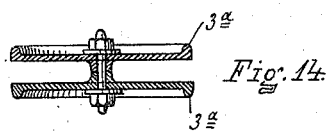

In the drawings, Figure 1 shows in perspective my cultivator in position for operation. Fig. 2 shows details of the devices for adjusting or carrying the cultivator, which are applied to the front end of the implement. Fig. 3 shows details of the rear portion of the adjusting mechanism. Fig. 4 shows other details relating particularly to a latch for securing the parts in adjusted position. Figs. 5 and 6 show details of the mechanism removed from the frame of the implement. Fig. 7 shows a modified form of construction. Fig. 8 shows in detail, partially removed from the frame of the implement, another form of construction. Fig. 9 shows the same implement with the same attachments shown in Fig. 7, with the mechanism adjusted to carry the cultivator free and clear of the ground. Fig. 10 shows in detail the devices for adjusting and supporting the implement as shown in Figs. 7 and 9 removed from the frame. Fig. 11 shows details of the arms which carry the front wheel in the form of construction shown in Figs. 7 and 9. Fig. 12 shows details of the lever and latch or catch employed in the same construction. Fig. 13 shows details of a sliding hanger and operating-lever employed in the same construction. Fig. 14 shows in detail, partially in section, a two-part wheel employed in the construction shown in Figs. 7 and 9. Fig. 15 shows the same mechanism as shown in Fig. 10 adjusted to a position to elevate the implement above the ground.

Referring to the reference letters and figures in a more particular description of the device, the frame A consists of three framebars hinged together at their front ends and adjustably connected at their rear ends to be extended inward or outward from the central line or central beam in the usual form of cultivators. The cultivator is provided with teeth or shares B B, secured on the several bars of the implement also in the usual manner.

On the forwardly-projecting end of the frame, to which the horse is hitched, I pivot at 1 a pair of crooked swinging arms 2, in the swinging ends of which is mounted a wheel 3. This wheel is mounted on a pivot 4 between the arms 2. For adjusting the wheel 3 by means of the arms 2 I provide a connecting-rod 5, which is pivotally connected at 6 below the plane of the frame to the ends of the arms 2, and is extended backwardly and upwardly over the frame to a position between the handles C. To the rear end of the middle beam of the frame there is pivoted at 7 a lever 8, which is carried upwardly and has the rear end of the connecting-rod 5 pivoted thereto at 9.

Adjacent to the pivotal point 9 on the lever 8 is attached the upper end of the sliding hangers 16, which operate through guides 15, attached to the rear end of the middle framebar or the shank of the tooth mounted thereon, and on the lower end these hangers 16 carry the roller 17.

For securing the device in its various positions of adjustment I provide a latch 11, pivoted to the connecting-bar 5 and passing through a keeper $11^b$ on the lever 8. This latch is provided with a series of notches which allow it to engage the lower edge of the keeper $11^b$ and secure the parts in any desired position of adjustment. For holding the latch or catch 11 in engagement, or rather to prevent it from being accidentally thrown out of position, I provide a spring 12, as shown.

By disengaging the latch or catch 11 and operating the lever 8 the wheel 3 and roller 7 are simultaneously projected or withdrawn, and the construction is so arranged that when fully projected the faces of the wheels 3 and 17 will project to a line below the plane of the points of the teeth and support the implement free and clear from the ground. When fully withdrawn, by operating the mechanism in the opposite direction the wheel and roller will be elevated to a position so as to not in the slightest interfere with the operation of the teeth of the implement to their fullest extent, and between these two positions they may be adjusted so as to regulate the depth of the cut of the teeth.

In the modified form of construction shown in Figs. 7 and 9 to 15, inclusive, the form of the arms 2 is modified to the form indicated in 2ª in these figures, and the arms are adapted and arranged to swing backwardly and upwardly in retiring the wheel 3ª, the arms being pivoted at 1ª to front end of the frame. The wheel 3ª, as shown particularly in Fig. 14, is a two-part wheel, which adapts it to straddle the middle beam of the frame A when fully retired, as shown in Figs. 7 and 10. The connecting-rod 5ª of this modified form of construction varies from the connecting-rod of the main construction in being extended entirely over the top of the frame, as shown, but is operated by a lever 8ª, substantially in the same manner as in the main construction. For securing this form of construction in adjusted position I provide a latch 11*, pivoted at 10ª to the lever 8ª and adapted to engage in a series of notches 5* in the connecting-bar 5ª. This end of the latch is provided with an eye 11ª, through which the bar 5ª passes, but which is large enough to allow it to be disengaged from the notches 5*. A spring 12ª is provided which prevents the latch from being accidentally displaced, and for operating the latch there is provided a bell-crank handle-piece 13, connected by a wire or other suitable connection 14 with the latch. The hangers 16 and roller 17 of this form of construction are the same as of the main construction, except that the upper ends of the hangers are secured at the pivotal point 9ª on the lever 8 instead of at a different point from the rear end of the connecting-rod, as in the main construction. The operation of this form of construction is essentially the same as of the main construction. It may, however, be noted that with this form of arm 2ª swinging backwardly and upwardly in retiring the front wheel the wheel is brought closer to the front teeth of the implement, which makes it shorter on its base and more readily turned around, and the arms 2ª inclining downwardly and backwardly when the wheel is extended enables the machine to more readily ride over obstructions, especially larger ones.

In the modified form of construction shown in Fig. 8 the forward wheel 3ᵇ is carried by a lever $x$, pivoted to the frame-bar at $y$ and projecting to a point above the rear portion of the frame in position to be readily reached and operated as a handle. For securing this lever there is provided a vertical tooth-rack $z$, secured on the frame and adapted to be engaged by a catch $w$ on the lever. The rear roller 17ª is mounted in the sliding hanger 16ª, operating through a guide 15ª. For operating the hanger 16ª there is provided a crooked arm $m$, pivoted to the frame $n$ and operated by a connecting-rod $o$ from the lever-handle $x$. The operation of this construction is obvious.

What I claim as new, and desire to secure by Letters Patent, is—

The combination in a cultivator of the frame having a middle frame-bar, teeth secured to the frame and particularly one on the rear end of the middle frame-bar, a pair of handles secured to the middle frame-bar, a wheel-adjusting lever pivoted adjacent to the rear end of the middle frame-bar, a lead-wheel, a lead-wheel hanger a connection between the lead-wheel hanger and the wheel-adjusting lever, a curved sliding wheel-hanger attached at its upper end to the adjusting-lever, a sleeve or eye secured to the frame back of the said rear tooth, a wheel carried by said curved hanger close behind the tooth and a catch for securing the adjusting-lever, substantially as set forth.

In witness whereof I have affixed my signature in presence of two witnesses.

DE WANE B. SMITH.

Witnesses:
  E. WILLARD JONES,
  DWIGHT H. COLEGROVE.